Figure 3:
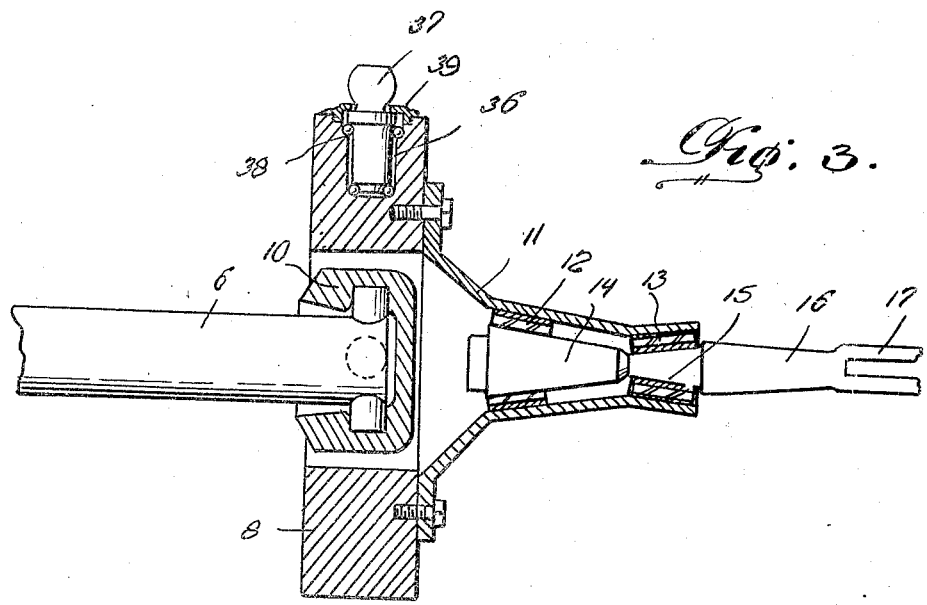

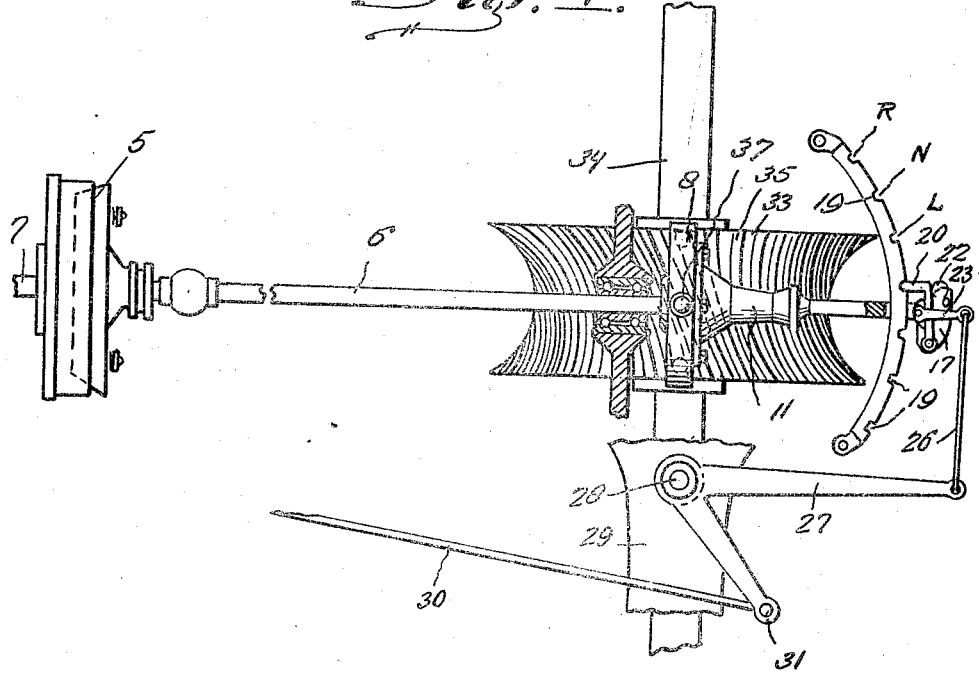
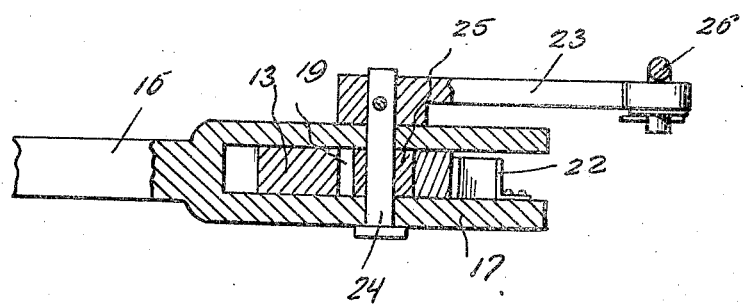

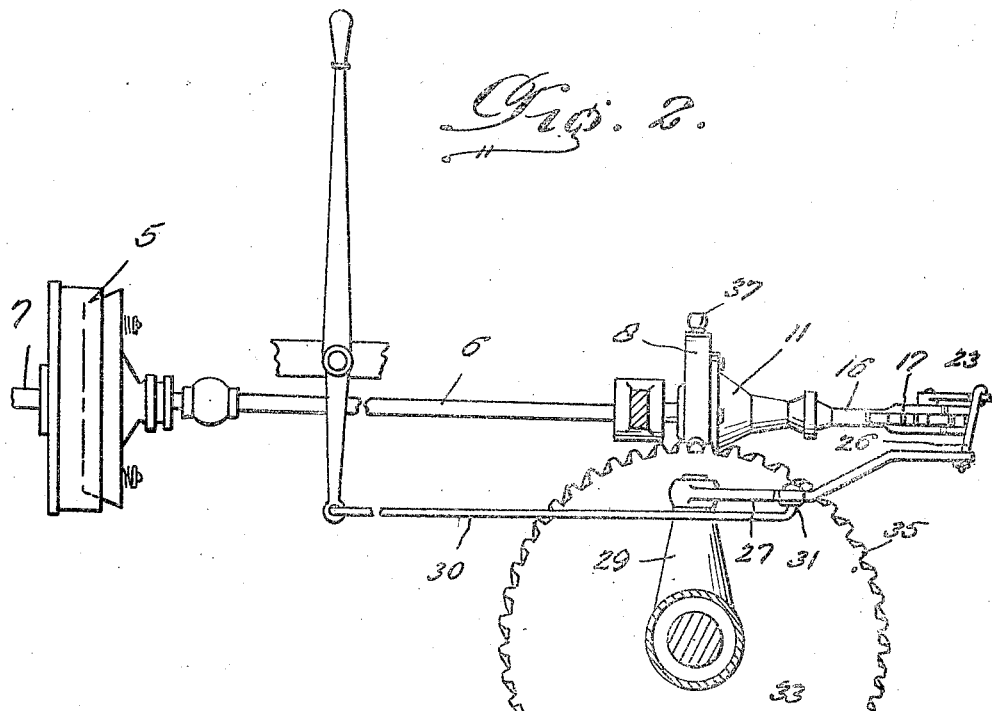
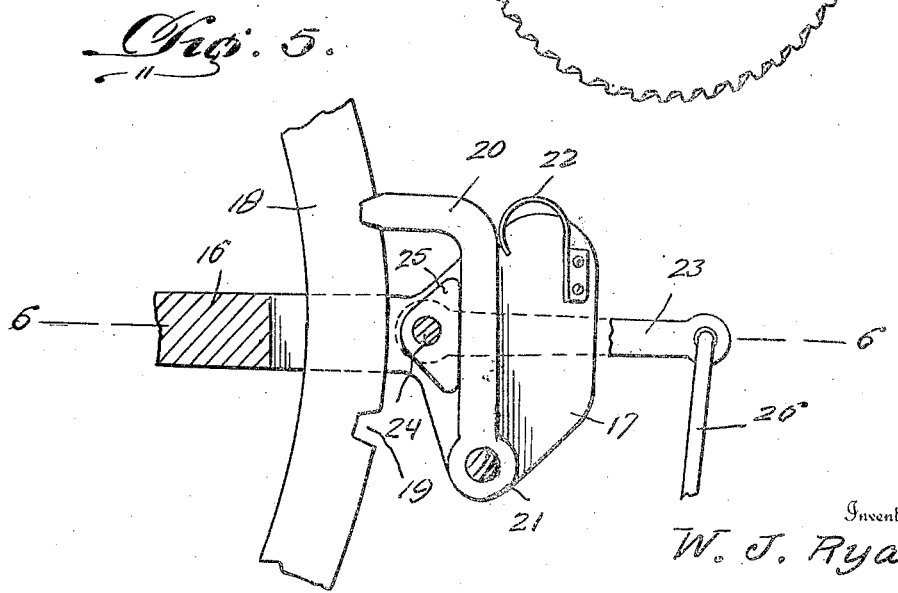

Feb. 9, 1926.

W. J. RYAN 1,572,312

TRANSMISSION

Filed July 1, 1925          3 Sheets-Sheet 3

Inventor
W. J. Ryan,
By Clarence A. O'Brien
Attorney

Patented Feb. 9, 1926.

1,572,312

UNITED STATES PATENT OFFICE.

WILLIAM J. RYAN, OF GARY, INDIANA.

TRANSMISSION.

Application filed July 1, 1925. Serial No. 40,860.

*To all whom it may concern:*

Be it known that I, WILLIAM J. RYAN, a citizen of the United States, residing at Gary, in the county of Lake and State of Indiana, have invented certain new and useful Improvements in a Transmission, of which the following is a specification.

The present invention relates to a transmission, and has for its principal object to provide means for transmitting motion from a driving member to a driven member at different ratios of speed, said transmission being operable so that the driven member may be reversed or held in a neutral position.

Another important object of the invention is to provide a transmission of this nature which does away with the numerous gears found in the transmission now in common use, thereby eliminating flashing of gears, unnecessary noise, and the wear and tear incident thereto.

With the above and numerous other objects in view as will appear as the description proceeds, the invention resides in certain novel features of construction, and in the combination and arrangement of parts as will be hereinafter more fully described and claimed.

In the drawing:—

Figure 4:
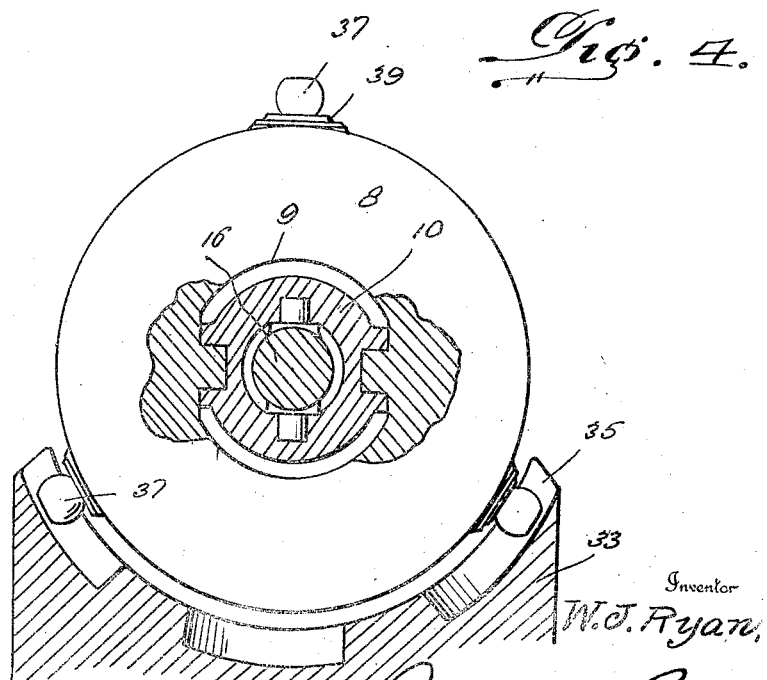

Figure 1 is a top plan view of the transmission embodying the features of my invention, Figure 2 is a side elevation thereof, Figure 3 is a sectional view through the driving members of the transmission, Figure 4 is an enlarged transverse section through a portion of the transmission, Figure 5 is an enlarged fragmentary plan view of the rack and pawl mechanism, and Figure 6 is a section taken therethrough substantially on the line 6—6 of Figure 5.

In the present showing of the invention, I have described the same particularly with the structure of an automobile or like vehicle, and it is to be understood that the principles may be applied to other arts without departing from the spirit of this invention. Referring to the drawing in detail, it will be seen that 5 designates an ordinary clutch having the driving shaft 6 associated therewith, and the engine shaft 7 in the usual manner. A driving member 8 in the form of an annulus has a central opening 9 for receiving a suitable universal joint 10 mounted on the end of the driving shaft 6. A housing 11 extends from the driving member 8 so as to be coaxially disposed therewith at all times, and has suitable roller bearing devices 12 and 13 incorporated therein for receiving the cone portions 14 and 15 respectively of the shifting member 16, which has its outer end bifurcated as at 17 to straddle an arcuate rack 18 having notches 19 therein. A dog 20 is pivoted as at 21 between the bifurcations 17 and the extremity thereof is normally engaged in one of the notches 19 by a spring 22. An arm 23 is pivoted as at 24 between the bifurcations 17, and has operable therewith a cam 25 for releasing the dog 20 when said arm 23 is swung. A link 26 is attached to the end of the arm 23, and to one end of a bell crank lever 27 pivoted as at 28 to the axle housing 29 and operable through a rod 30 pivoted to the other end thereof as at 31. It will thus be seen that by moving the rod 30 the driven member may be shifted to different angular positions in relation to the driving shaft 6.

A driven member 33 is keyed to the driven shaft 34, and is provided with a plurality of transversely extending lugs 35 on its periphery, which in the present instance are disposed diagonally. The driving member 8 is provided with radially disposed pockets 36 for rotatably receiving driving lugs 37, suitable anti-friction means 38 being associated therewith. These lugs are held in place by caps 39. The lugs 37 are adapted to enter the spaces between the lugs 35 for the purpose of driving the driven member 33 and the shaft 34.

When the dog 20 is in the notch 19, designated specifically by the letter R, the transmission is in reverse. When the member 16 is shifted so that the dog is in the notched end, the transmission is in neutral, since the path of movement of the lug 37 is coincident to the direction in which the lugs 35 are disposed. When the member 16 is shifted so that the dog 20 is in the notch L, the transmission is in low speed. The other notches 19 which have not been specifically designated by letters represent other higher speeds in a forward direction. In the embodiment of the invention just described it will be noted that when the transmission is in neutral, that the same acts as a lock, or an emergency brace, and prevents the rotation of the shaft 34 in either direction.

If this transmission is to be used where an equal number of reverse positions would be desirable to the number of forward positions it would only be necessary to dispose the lugs 35 rectangularly across the periphery of the driven member 33.

From the above it will be seen that I have produced an exceedingly simple transmission mechanism which will be thoroughly efficient and reliable in operation, strong, durable, inexpensive, to manufacture, not likely to easily become out of order, and otherwise well adapted to the purpose for which it is designed. The present embodiment of the invention has been disclosed merely by way of example since in practice it attains features of advantage enumerated as desirable in the statement of the invention and the above description. It is apparent, however, that numerous changes in the details of construction, and in the combination and arrangement of parts may be resorted to without departing from the spirit or scope of the invention as hereinafter claimed or sacrificing any of its advantages.

Having thus described the invention, what I claim as new and desire to secure by Letters Patent is:—

1. A transmission mechanism of the class described including a driving shaft, a driving member, a universal joint between the driving shaft and the driving member, means for disposing the driving member at different angles to the driving shaft, lugs on the driving member, a driven member, lugs on the driven member adapted to be engaged by the lugs on the driving member, a housing extending from the driving member, a shifting member in the housing, and means for actuating the shifting member.

2. A transmission mechanism of the class described including a driving shaft, a driven member, a universal joint between the driving shaft and the driving member, means for disposing the driven member at different angles to the driving shaft, lugs on the driving member, a driven member, lugs on the driven member adapted to be engaged by the lugs on the driving member, a housing extending from the driving member, a shifting member in the housing, the extremity of said shifting member being bifurcated, a notched rack between the bifurcations, a dog pivoted between the bifurcations and engageable with the notches of the rack, and means for simultaneously releasing the dog and shifting the shifting member.

3. A transmission mechanism of the class described including a driven member in the form of an annulus having transverse cam lugs on its periphery, a driving shaft disposed transversely to the axis of the driven member, a universal joint on the end of the driving shaft, a driving member attached to the universal joint, lugs extending from the driving member radially thereof for engagement with the lugs of the driven member, and means for shifting the driving member in different angular relation to the driving shaft to change the ratio between the driving and driven members.

In testimony whereof I affix my signature.

WILLIAM J. RYAN.